United States Patent
Oya et al.

(10) Patent No.: US 7,505,146 B2
(45) Date of Patent: Mar. 17, 2009

(54) METHOD AND DEVICE FOR DETECTING DIRECTION OF MEMBER HAVING OUTER PERIPHERY FORMED IN VERTICALLY ASYMMETRICAL SHAPE

(75) Inventors: Hiroyuki Oya, Kashiwazaki (JP); Ryoji Usui, Kashiwazaki (JP); Hajime Tanabe, Kashiwazaki (JP); Koei Watanabe, Joetsu (JP); Mitsuyasu Fukusawa, Nyuzen-machi (JP); Osamu Watanabe, Kurobe (JP)

(73) Assignees: Kabushiki Kaisha Riken, Toyoko (JP); YKK Corporation, Toyoko (JP)

( * ) Notice: Subject to any disclaimer, the term of this patent is extended or adjusted under 35 U.S.C. 154(b) by 409 days.

(21) Appl. No.: 10/597,441

(22) PCT Filed: Nov. 26, 2004

(86) PCT No.: PCT/JP2004/017565

§ 371 (c)(1),
(2), (4) Date: Jul. 25, 2006

(87) PCT Pub. No.: WO2005/071355

PCT Pub. Date: Aug. 4, 2005

(65) Prior Publication Data

US 2008/0252902 A1    Oct. 16, 2008

(30) Foreign Application Priority Data

Jan. 26, 2004    (JP) ............................. 2004-017264

(51) Int. Cl.
G01B 11/24    (2006.01)
(52) U.S. Cl. ...................................................... 356/601
(58) Field of Classification Search ....................... None
See application file for complete search history.

(56) References Cited

FOREIGN PATENT DOCUMENTS

| JP | 48-99787 A | 12/1973 |
| JP | 47279/1992 | 4/1992 |
| JP | 9-133520 A | 5/1997 |

*Primary Examiner*—Gregory J Toatley, Jr.
*Assistant Examiner*—Amanda H Merlino
(74) *Attorney, Agent, or Firm*—Husch Blackwell Sanders LLP

(57) ABSTRACT

A method and a device for identifying an upper surface and a lower surface of a component having asymmetric upper and lower outer shapes are provided. In particular, a method and a device for identifying orientation of an item that hardly allows visual identification of the upper and lower surface. A disk-like, cylindrical, or annular component having asymmetric upper and lower outer shapes is placed on a reference surface having a reference block, an outer peripheral part of the component on the reference surface is brought into contact with the reference block, and identification of the upper and lower surface of the component is achieved in an inline system based on a gap created between the outer peripheral part of the component and the reference block, using a light source lighting device and a detection camera arranged across the reference block.

7 Claims, 3 Drawing Sheets

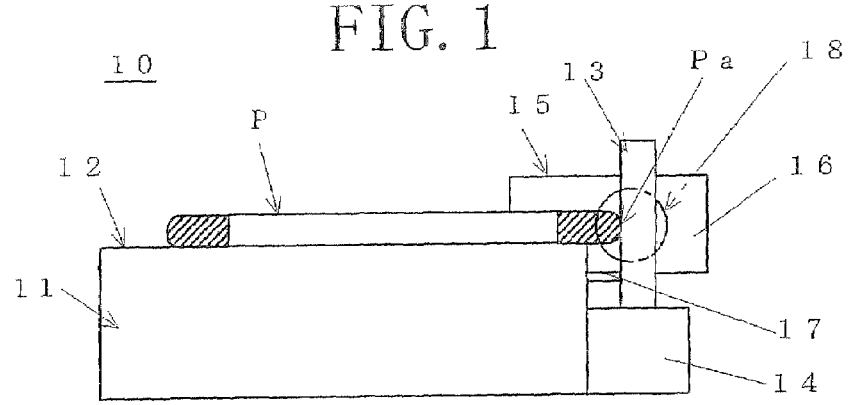

METHOD AND DEVICE FOR DETECTING DIRECTION OF MEMBER HAVING OUTER PERIPHERY FORMED IN VERTICALLY ASYMMETRICAL SHAPE

CROSS REFERENCE TO RELATED APPLICATION

This application is a U.S. nationalization of International Application PCT/JP2004/017565, filed Nov. 26, 2004, which claims the benefit of priority from Japanese Patent Application No. 2004-17264, filed Jan. 26, 2004.

TECHNICAL FIELD

The present invention relates to a method and a device for detecting orientation of a component that has asymmetric upper and lower shapes such as a tapered or eccentric curved outer surface, for example a disk-like, cylindrical, or annular component, more particularly an engine part such as a piston ring that has a top-bottom orientation.

BACKGROUND ART

Automobile engines are required to meet the demands for better fuel economy and higher performance due to global environmental issues. As an engine part, high-functionality piston rings that enable good fuel economy and low oil consumption are sought after. Examples of such piston rings include inner rings and eccentric barrel face rings (BF ring).

FIGS. 5(a) and 5(b) show one example of an inner ring 1 and an eccentric BF ring 2, respectively.

The piston rings that have a top-bottom orientation such as these inner ring 1 and eccentric BF ring 2 can achieve their functions when their top-bottom orientation is correct. That is, these rings are designed to achieve required functions only when they are mounted to pistons in correct orientation. For example, the inner ring 1, when its inner surface 1a is on the upper side as shown in FIG. 5(a), can provide a good seal by the inner peripheral edge 1b on the lower side of the ring making high-pressure surface contact with the bottom surface of a ring groove (not shown), thereby preventing oil from traveling up into the combustion chamber through the backside of the ring. The inner ring 1 is contorted into a plate-like shape and fitted in the piston groove, and this state of being a plate-like shape provides the effect of preventing leakage of combustion gas, the effect of increasing compression ratio, and a wedge effect that allows easy spread of oil on the inner wall of the cylinder on the side of the combustion chamber. In other words, if the inner surface 1a is on the lower side, these effects cannot be achieved, and the engine performance may be deteriorated.

Piston rings, valve lifters, and other disk-like, cylindrical, or annular components that are sought after on the recent market have highly precise shape and dimensions because of their high-functionality. They are sometimes of a design that hardly allows visual determination of the top-bottom orientation, like the eccentric BF ring shown in FIG. 5(b), for example. These high-precision piston rings undergo complicated processing, where it is necessary to identify the orientation of the components not only in a process step of providing a marking or the like for identifying the top and bottom, but also in each of various process steps in manufacture. In the processing of disk-like, cylindrical, or annular components that have an orientation because of asymmetric upper and lower outer shapes such as piston rings, it is essential to keep the components oriented correctly during the processing.

The demands for high-functionality and high-precision components as mentioned above call for a simple method of identifying the top-bottom orientation of disk-like, cylindrical, or annular components that have asymmetric upper and lower outer shapes, for example eccentric BF rings, which hardly allow visual determination of the top and bottom, so that these components can always be oriented correctly all through the processing.

DISCLOSURE OF INVENTION

Problems to be Solved by the Invention

In the conventional techniques, commercially available laser displacement sensors that generally have a small spot size are widely used as an orientation recognition technique. With this method, laser is scanned over a cross section to be measured, and it is identified whether it is a top side or a bottom side based on displacement signals.

FIGS. 6(a) and 6(b) show a method of identifying orientation of a piston ring 4 using a displacement sensor 3.

To detect the top-bottom orientation of the component with this displacement sensor 3, it is first determined which part the sensor 3 is measuring based on previously collected data on the shape and dimensions of the target piston ring 4, and then the orientation is identified based on obtained displacement data. That is, the top-bottom orientation of the piston ring 4 is identified from the difference between a measured displacement 1 shown in FIG. 6(a) and a measured displacement 2 shown in FIG. 6(b). This is because the displacement sensor 3 measures the distance from a measurement reference point with the small spot and does not measure the shape of the piston ring 4 itself. With this method, either the displacement sensor 3 or the piston ring 4 must be moved for the scanning, because of which the measurement time is long, and also, the measurement results are largely susceptible to the effects of vibration or temperature. For items that hardly allow visual identification of orientation such as eccentric BF rings or outer taper rings, in particular, accurate and easy orientation identification is not feasible from the point of resolution, and therefore this method is not effective. In other words, if the piston ring 4 is replaced with the eccentric BF ring 2 shown in FIG. 5(b), the detection of the top and bottom surfaces becomes difficult.

Other non-contact methods of identifying orientation of components include image processing methods using LEDs or halogen illumination. These methods usually involve illuminating part of the component that provides a marker for identifying the orientation (for example, the inner surface in the case with the inner ring), capturing an image with a CCD camera of the difference in brightness between the illuminated part and other parts, and binarizing the image at a certain brightness threshold so as to determine the orientation based on areas or number of pixels of the image. Such method increases setup time in multi-kinds, small-amount production of items having different cross-sectional shapes, where the optimal illumination and camera positions and the threshold values for the image processing must be changed in accordance with the shape of each item. As the method requires a complicated operation, it is possible that errors are made. Moreover, apart from a case where a workpiece is determined to be defective because of an obvious unevenness in the image, with the simple binary image processing, there is the risk of an erroneous result even with workpieces that have no problems in their functions, and therefore a complex image processing algorithm may be required to correct the erroneous result. Such algorithm will have to be closely inspected if it is optimal for each type of items, and the setting up for a new item will require much time.

Other methods include a contact type orientation identification method using a lever dial gauge, wherein displacement in the contact part is converted into electrical signals, based on which a determination is made. This method allows for easy measurement, but contrarily, because of its simple principle, it includes many factors dependent on precision when in use, in view of the problems that the dial gauge tip wears with time, that measurement results are very susceptible to vibration, and that the dial gauge tip diameter and its material must be selected for each target object of orientation identification in accordance with the cross-sectional shape, surface roughness, and other properties, and therefore it is not feasible in practice.

To stun up the foregoing, in the production or processing of components that have asymmetric upper and lower outer shapes, for example, disk-like, cylindrical, or annular components such as eccentric BF rings, it is necessary to recognize the orientation of the components; in the case with producing multiple types of items, the optimal setting positions and conditions of the sensors and illumination devices for the orientation identification must be changed for each discrete item, which increases burden on operators and lowers productivity. In response to the market demands arising from environmental issues for high-functionality rings such as eccentric BF rings that hardly allow visual identification of orientation, a technique that enables orientation identification of these components during the processing is required.

Therefore, an object of the present invention is to provide an orientation detecting method and a device for identifying a top surface and a bottom surface of a component easily and reliably without taking much time so as to enable stable processing of components that hardly allow visual identification of orientation, for example, disk-like, cylindrical, or annular components, typically piston rings, while improving operation efficiency and productivity.

Means to Solve the Problem

According to the present invention, a method for detecting orientation of a component is characterized by the steps of: placing a component having asymmetric upper and lower outer shapes on a reference surface having a reference block; bringing an outer peripheral part of the component on the reference surface into contact with the reference block; and identifying the top-bottom orientation of the component based on a gap created between the outer peripheral part of the component and the reference block.

Here, it is preferable that the reference block is tapered in a portion abutting the outer peripheral part of the component.

In the present invention, it is preferable that the reference block has a shape conforming to part or all of a cross-sectional shape of the outer peripheral part of the component in a portion abutting the outer peripheral part of the component.

In the present invention, it is also preferable that the reference block has a mirror surface in a portion abutting the outer peripheral part of the component.

In the present invention, it is preferable that the component is any one of a disk-like component, a cylindrical component, and an annular component.

Further, it is preferable that the component is a piston ring.

According to the present invention, a device for detecting orientation of a component comprises a reference surface on which a component having asymmetric upper and lower outer shapes is placed, a reference block with which an outer peripheral part of the component placed on the reference surface is brought into contact, and a light source lighting device and a detection camera arranged opposite each other across the reference block.

In the present invention, "disk-like components" include thin tapered or non-tapered plates such as shims having a limited sliding surface, "cylindrical components" include valve lifters having an eccentric barrel shape or asymmetric upper and lower outer shapes, and "annular components" include piston rings and valve sheets.

Advantageous Effect of the Invention

According to the present invention, it is possible to identify the top-bottom orientation of components that have asymmetric upper and lower outer shapes, for example, disk-like, cylindrical, or annular components that have an orientation, more specifically eccentric BF rings, in a short time and with ease, and within an inline system, so that it is ensured that the components are processed in correct orientation.

Moreover, according to the present invention, it is possible to reliably prevent the components from being processed in wrong orientation resulting from an erroneous operation.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 1 is a side view showing one embodiment of an orientation identification method of the invention applied to an eccentric BF ring, with the relevant part cut away;

FIG. 2 is a top plan view of FIG. 1;

BEST METHOD FOR CARRYING OUT THE INVENTION

Figure 3:
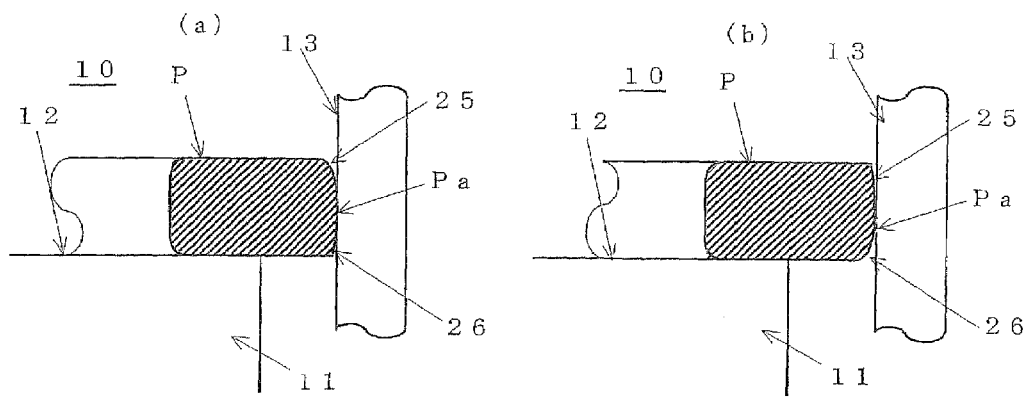
FIGS. 3(a) and 3(b) are enlarged views of the relevant part showing how the orientation of the eccentric BF ring of FIG. 1 is detected.

Preferred embodiments of the present invention will be hereinafter described in detail with reference to the accompanying drawings.

FIGS. 1 to 3(b) show one embodiment of the top-bottom orientation detecting method of the present invention applied to an eccentric BF ring P.

The orientation detecting device 10 according to this embodiment includes an inspection table 11 formed with a reference surface 12 having a flatness of ±0.05, on which the eccentric BF ring P is placed, a columnar reference block 13 provided on one side of the inspection table 11 with a support member 14 such as to stand upright with an orthogonality of ±0.05 relative to the reference surface 12, a light source lighting device 15 mounted on one side of the inspection table 11 with a support member 17 such that an illumination surface 16 is opposite the reference block 13, a CCD camera 18 mounted on one side of the inspection table 11 with a support member 20 such that an imaging surface 19 is opposite the illumination surface 16 of the light source lighting device 15, determining means 21 for making a determination based on measurement results of this CCD camera 18, and a monitor 22 for displaying the image taken by the CCD camera 18.

In this arrangement, the light source lighting device 15 and the CCD camera 18 are placed opposite each other along a tangential line of the eccentric BF ring P, so that the CCD camera 18 can pick up an image of a gap at a contact interface between the reference block 13 and an outer peripheral surface Pa of the eccentric BF ring P placed on the reference surface 12. Accordingly, the image taken by the CCD camera 18 consists of shadows (black image) of the eccentric BF ring P and the reference block 13 and the background light (white image) of the light source lighting device 15. Thus the obtained image allows easy measurements of height, width, and inclination of the outer peripheral part Pa of the eccentric BF ring P protruding and abutting on the reference block 13.

More preferably, part of the reference block 13 making contact with the outer peripheral part of the eccentric BF ring P should be a mirror surface. The mirror surface here is one with a surface roughness of Rz 0.1 or less. By making the part of the reference block 13 abutting the outer peripheral part of the eccentric BF ring P a mirror surface, light from the light source lighting device 15 through the gap between the outer peripheral part of the eccentric BF ring P and the reference block 13 is amplified by mirror surface reflection or diffused reflection, whereby a determination is made more accurately and easily. For example, when the reference block 13 making contact with the outer peripheral part of the eccentric BF ring P had a mirror surface of a surface roughness of Rz 0.1 or less, the area of a light leak at the contact interface represented as a blob by image processing was about 1.8 times larger than that when the same ring P was measured using a reference block 13 having a surface roughness of more than Rz 0.1, which is not a mirror surface by definition here.

The light source lighting device 15 is, for example, an LED. A blue LED having a short wavelength or parallel light illumination is preferably used.

The determining means 21 measures and analyses the images captured by the CCD camera 18 and stored in an image memory using an image analyzation circuit so as to recognize the top-bottom orientation of the eccentric BF ring P. With quantifying methods, a determination is made based on pattern matching correlation, or the area or the center of gravity of light leaks, represented as blobs by image processing, on both sides of the contact interface.

Next, the method for detecting the top-bottom orientation of the eccentric BF ring P using the orientation detecting device 10 according to this embodiment will be described.

First, the eccentric BF ring P is placed on the reference surface 12, and then pressed against the reference block 13 as shown in FIGS. 1 and 2.

Next, the eccentric BF ring P is illuminated from its tangential direction by the light source lighting device 15. Then the CCD camera 18, which is arranged opposite the lighting across the reference block 13, picks up an image of the contact interface between the outer peripheral surface Pa of the eccentric BF ring P and the reference block 13. The light projected from the light source lighting device 15 towards the CCD camera 18 leaks through a gap formed by the eccentric BF ring P and the reference block 13; for example, as shown in FIGS. 3(a) and 3(b), the CCD camera 18 picks Up an image of a light leak 25 on the upper side and a light leak 26 on the lower side, which is displayed on the monitor 22 through the determining means 21. Since the upper-side light leak 25 is larger than the lower-side light leak 26 in the case shown in FIG. 3(a) as compared to the case shown in FIG. 3(b), it is thus recognized that the upper surface of the eccentric BF ring P is on the upper side. Such identification of orientation can also be made based on the center of gravity. Not to mention, the orientation may be identified based on whether the contact interface is located on the upper side or lower side relative to the width of the eccentric BF ring P.

As described above, according to this embodiment, the eccentric BF ring P is placed on the reference surface 12, with outer peripheral surface Pa abutted on the reference block 13, and light is projected from the light source lighting device 15 toward the CCD camera 18, so that the orientation is identified based on light leaks through the gap at the contact interface between the reference block 13 and the outer peripheral surface Pa of the eccentric BF ring P. This method enables easy determination of the orientation of the eccentric BF ring P that hardly allows visual recognition of its orientation in various process steps, and eliminates the possibility that the ring is wrongly oriented. As the rings undergo desired processing after the orientation identification, it is ensured that they are processed in correct orientation, and thus the method enables easy production of high-functionality, high-precision eccentric BF rings P.

While the reference block 13 is fixed on the inspection table 11 by the support member 14 in this embodiment, the reference block 13 may be designed movable relative to the outer peripheral surface Pa of the eccentric BF ring P placed on the reference surface 12, using a device that allows parallel movement in horizontal direction either automatically or manually, for example, an actuator such as a pneumatic cylinder. In that case, the reference block 13 is brought toward the eccentric BF ring P to make contact with the outer peripheral surface Pa of the ring.

Moreover, while the reference block 13 is fixed on the inspection table 11 by the support member 14 in this embodiment, the reference block 13 may be integrated in a gauge, in which the eccentric barrel face ring P is fitted so that the ring makes contact with the reference block 13 by self-tension. In this case, the reference block 13 should be embedded in the gauge in such a manner that the outer peripheral surface Pa of the eccentric BF ring P will make contact with the reference block when inserted in the gauge.

While the reference block 13 is columnar in this embodiment, it is not a requirement and the reference block 13 may be cylindrical or plate-like. In short, as long as a surface or a line that makes contact with the outer peripheral surface Pa of the eccentric BF ring P is vertical relative to the reference surface 12, the entire reference block 13 need not be vertical relative to the reference surface 12.

While the measurement results of the CCD camera 18 are processed by the determining means 21 and the images taken by the CCD camera 18 are displayed on the monitor 22 in this embodiment, it is also possible to make a determination by processing the signals from the CCD camera 18 using an oscilloscope.

Figure 4:
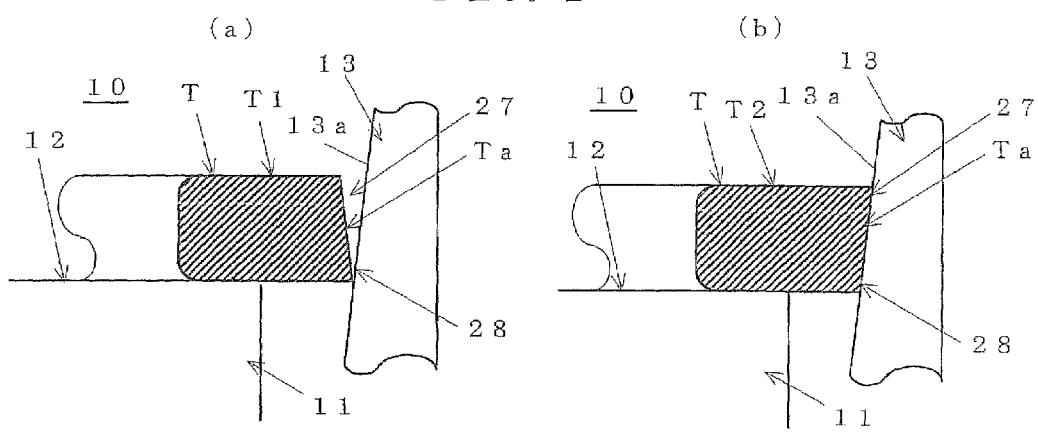
FIGS. 4(a) and 4(b) are enlarged views of the relevant part showing another embodiment of the orientation identification method of the invention applied to a taper ring, FIG. 4(a) showing how the top surface of the taper ring is detected, and FIG. 4(b) showing how the bottom surface of the taper ring is detected.
Figure 5:
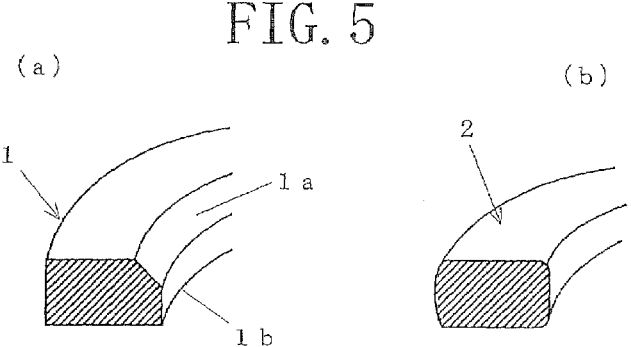
FIGS. 5(a) and 5(b) are perspective views showing examples of piston rings that have an orientation, FIG. 5(a) illustrating relevant part of an inner ring, and FIG. 5(b) illustrating relevant part of an eccentric BF ring.

FIGS. 4(a) and 4(b) show one embodiment of the top-bottom orientation detecting method of the present invention applied to a taper ring T.

This embodiment differs from the above-described embodiment in that the reference block 13 shown in FIGS. 1 and 2 is formed with a taper 13a conforming to a taper Ta of the taper ring T. The orientation detecting device used in this embodiment has substantially the same stricture as the device 10 shown in FIGS. 1 and 2 except for the outer shape of the reference block 13, and therefore the description of the device with reference to the drawings will be omitted.

In this embodiment, too, the taper ring T is placed on the reference surface 12 of the orientation detecting device 10, and then pressed against the reference block 13.

Next, the orientation of the taper ring T is identified based on the gap at the contact interface between the reference block 13 and the taper Ta of the taper ring T. That is, light is projected from the light source lighting device 15 toward the CCD camera 18, and the identification of orientation is achieved based on the conditions of light leaks through the gap formed between the taper ring T and the reference block 13. For example, when the top surface T1 of the taper ring 1 is on the upper side, the taper Ta does not match the taper 13a of the reference block 13 as shown in FIG. 4(a), while, when the bottom surface T2 of the taper ring T is on the upper side, the taper Ta matches the taper 13a of the reference block 13 as shown in FIG. 4(b). Therefore, the difference between an upper light leak 27 and a lower light leak 28 at the interface between the taper ring T and the reference block 13 when the top surface T1 of the taper ring T is on the upper side differs from when the bottom surface T2 is on the upper side, based on which the orientation can be identified. Instead of providing a taper on the reference block 13, the reference surface 12 may be inclined conforming to the taper Ta.

As described above, according to this embodiment, since the difference in the gap between the top and bottom surface of the taper ring T is even clearer, the signal/noise ratio is increased.

While the reference block 13 is formed with a taper 13a conforming to the taper Ta of the taper ring T in this embodiment, the reference block 13 may have a shape that corresponds to part or all of the outer peripheral cross sectional shape of the taper ring.

In this embodiment, too, as with the previously described embodiment, the taper 13a of the reference block 13 conforming to the taper Ta of the taper ring T should preferably have a mirror surface.

Figure 6:
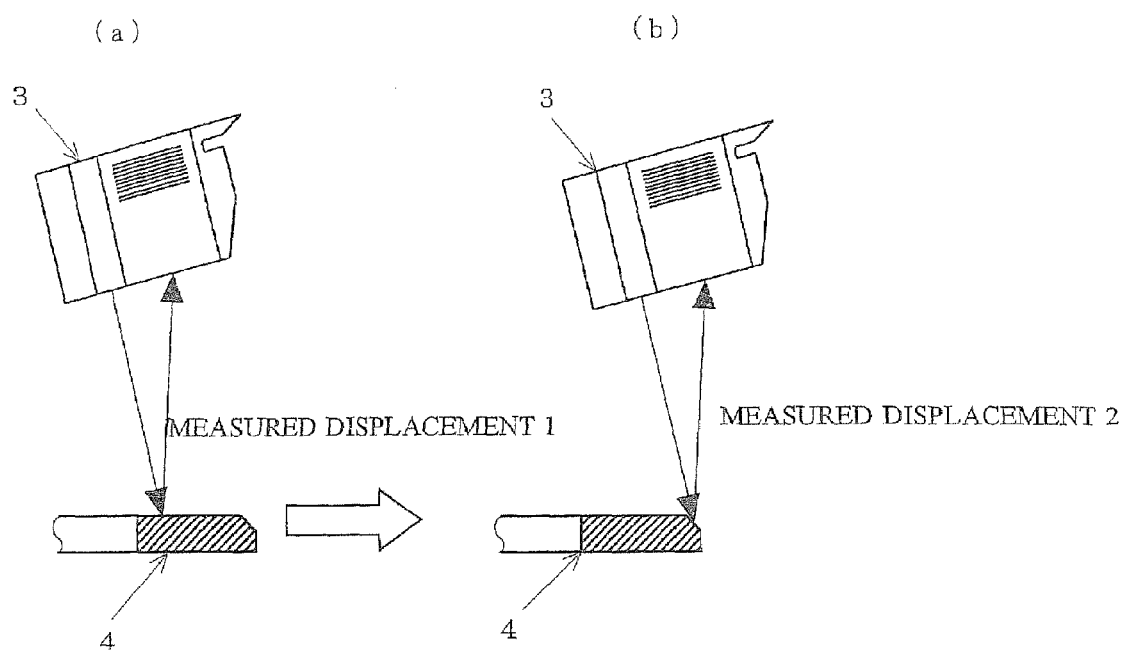
FIGS. 6(a) and 6(b) are diagrams for explaining one example of an orientation identification method using a laser spot displacement sensor, FIG. 6(a) showing a measured displacement 1, and FIG. 6(b) showing a measured displacement 2.

Furthermore, the present invention is also applicable in combination with the conventional identification method shown in FIGS. 6(a) and 6(b). This will enable even more reliable identification of the orientation of items that have complex shapes. That is, in the processing of piston rings where there may be items of complex shapes that include both a certain inner surface and an eccentric BF shape, the conventional identification method shown in FIGS. 6(a) and 6(b) can identify the orientation of the inner surface and the method according to the present invention can identify the orientation of the eccentric BF ring at the same time, whereby errors in the processing are reliably prevented.

The invention is not limited to the above embodiments and various modifications may be made without departing from the spirit and scope of the invention. Any improvement may be made in part or to all of the components.

INDUSTRIAL APPLICABILITY

The present invention is advantageously applied in identification of orientation of components having a cross-sectional shape that hardly allows visual identification of the orientation, for example piston rings that have a top-bottom orientation.

The invention claimed is:

1. A method for detecting orientation of a component, comprising the steps of:
    placing a component having asymmetric upper and lower outer shapes on a reference surface having a reference block;
    bringing an outer peripheral part of the component on the reference surface into contact with the reference block; and
    identifying the top-bottom orientation of the component based on a gap created between the outer peripheral part of the component and the reference block.

2. The method for detecting orientation of a component according to claim 1, wherein
    the reference block is tapered in a portion abutting the outer peripheral part of the component.

3. The method for detecting orientation of a component according to claim 1, wherein
    the reference block has a shape conforming to part or all of a cross-sectional shape of the outer peripheral part of the component in a portion abutting the outer peripheral part of the component.

4. The method for detecting orientation of a component according to claim 1, wherein
    the reference block has a mirror surface in a portion abutting the outer peripheral part of the component.

5. The method for detecting orientation of a component according to claim 1, wherein
    the component is any one of a disk-like component, a cylindrical component, and an annular component.

6. The method for detecting orientation of a component according to claim 1, wherein
    the component is a piston ring.

7. A device for detecting orientation of a component comprising:
    a reference surface on which a component having asymmetric upper and lower outer shapes is placed;
    a reference block with which an outer peripheral part of the component placed on the reference surface is brought into contact; and
    a light source lighting device and a detection camera arranged opposite each other across the reference block, wherein the top-bottom orientation of the component is identified based on a gap created between the outer peripheral part of the component and the reference block.

* * * * *

UNITED STATES PATENT AND TRADEMARK OFFICE
CERTIFICATE OF CORRECTION

PATENT NO. : 7,505,146 B2 Page 1 of 1
APPLICATION NO. : 10/597441
DATED : March 17, 2009
INVENTOR(S) : Hiroyuki Oya It is certified that error appears in the above-identified patent and that said Letters Patent is hereby corrected as shown below:

Col. 3, line 17, delete "stun" and replace with -- sum --

Signed and Sealed this

Twenty-eighth Day of April, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 7,505,146 B2 |
| APPLICATION NO. | : 10/597441 |
| DATED | : March 17, 2009 |
| INVENTOR(S) | : Hiroyuki Oya et al. |

It is certified that error appears in the above-identified patent and that said Letters Patent is hereby corrected as shown below:

On the title page item (73), delete "Kabushiki Kaisha Riken, Toyoko (JP); YKK Corporation, Toyoko (JP)" and replace with -- Kabushiki Kaisha Riken, Tokyo (JP); YKK Corporation, Tokyo (JP) --

Signed and Sealed this

Second Day of June, 2009

JOHN DOLL
*Acting Director of the United States Patent and Trademark Office*